(12) United States Patent
Segman et al.

(10) Patent No.: US 6,191,827 B1
(45) Date of Patent: Feb. 20, 2001

(54) ELECTRONIC KEYSTONE CORRECTION FOR ELECTRONIC DEVICES WITH A VISUAL DISPLAY

(75) Inventors: Yosef Segman, Zichron Yaacov; Gady Yearim; Avy Strominger, both of Haifa, all of (IL)

(73) Assignee: Oplus Technologies Ltd., Haifa (IL)

( * ) Notice: Under 35 U.S.C. 154(b), the term of this patent shall be extended for 0 days.

(21) Appl. No.: 09/201,849

(22) Filed: Dec. 1, 1998

(51) Int. Cl.$^7$ ..................................................... H04N 3/23
(52) U.S. Cl. ........................ 348/746; 348/747; 348/806; 348/807
(58) Field of Search .................................... 348/241, 252, 348/335, 571, 572, 580, 625, 628, 745, 746, 747, 757, 761, 806, 807; 315/368.13, 371; 349/73; 353/69; 358/20; 382/275; H04N 3/23

(56) References Cited

U.S. PATENT DOCUMENTS

| | | | |
|---|---|---|---|
| 5,283,602 | * | 2/1994 | Kwon ........................................ 353/69 |
| 5,345,280 | * | 9/1994 | Kimura et al. ......................... 348/745 |
| 5,355,188 | * | 10/1994 | Biles et al. ............................... 353/69 |
| 5,369,450 | * | 11/1994 | Haseltine et al. ..................... 348/745 |
| 5,465,121 | * | 11/1995 | Blalock et al. ........................ 348/744 |
| 5,473,391 | * | 12/1995 | Usui ....................................... 348/746 |
| 5,664,858 | * | 9/1997 | Woo ........................................ 353/69 |
| 5,739,870 | * | 4/1998 | Simpson ............................... 348/628 |
| 5,752,758 | * | 5/1998 | Woo ........................................ 353/69 |
| 5,764,311 | * | 6/1998 | Bonde et al. ......................... 348/746 |
| 5,795,046 | * | 8/1998 | Woo ........................................ 353/69 |
| 5,847,777 | * | 12/1998 | George ................................. 348/746 |
| 6,002,454 | * | 12/1999 | Kajiwara et al. ..................... 348/806 |

* cited by examiner

Primary Examiner—Sherrie Hsia
(74) Attorney, Agent, or Firm—Mark M. Friedman (57) ABSTRACT

A method of electronic Keystone correction for electronic devices having visual displays which exhibit optical distortion on the display screen. The corrective method is based on computation and electronic (physical) manipulation of the pixels of a visual display screen grid, and features the principle steps of: 1) characterization of the size of an input image, 2) determination of the number of generated pixels in the output image, 3) determination of the real position of each pixel in the output image by performing an electronic distortion to the input image opposite to the optical distortion of the input image, 4) interpolation of the output value of all color components of each pixel of the input image, 5) correction of (non-uniform) edge effects at both ends of each line of pixels, 6) transmission of the output corrected image to the electronic display device, individually, pixel by pixel, or as complete set of corrected pixels of the image, and 7) display of the perfected corrected optical image. The method of this invention solves at least two universally known optical distortion problems involving trapezoidal distortion and computerized diagonal line drawing. Moreover, the method of this invention is applicable to real time domain of operation of electronic devices with visual displays.

15 Claims, 8 Drawing Sheets

(1) Characterize the size of the input image.

(2) Determine the number of generated pixels in the output image.

(3) Determine the real position of each pixel in the output image via an opposite distortion to the optical distortion.

(4) Interpolate the output value of all color components of each pixel of the input image.

(5) Correct (non-uniform) edge effects at both ends of each line of pixels.

(6) Transmit the output image to the display device.

(7) Display the perfected optical image.

FIG. 5

(1) Characterize the size of the Input Image.
- size of input image = N lines X M pixels in line.
- distortion mode of input image:
   (i) Ceiling mode - optical displayed image is narrower at top.
   (ii) Floor mode - optical displayed image is narrower at bottom.
  (a) number of lines per group: L = F [1 / tan (k)], (k) = Keystone angle; (LineCounter) initialize to 0 and count up to L - 1.
  (b) number of groups = C (N / L).
   (i) For Ceiling mode: (GroupCounter) initialize to 1 and count up.
   (ii) For Floor mode: (GroupCounter) initialize to C (N / L) and count down.

(2) Determine the number of generated pixels in the output image.
- number of input pixels per line = M.
  (a) number of output generated pixels per line = M - [2 * (GroupCounter)], and (GroupCounter) has black pixels inserted at both ends of the generated output pixels in every line.

(3) Determine the real position of each pixel in the output image via an opposite distortion to the optical distortion.
- I(i,j) = pixel value of the input image, I; with position coordinates of input pixel at line i, and column j, where i = 0 to N-1, and j = 0 to M-1.
- O(u,v) = pixel value of the output image, O; with position coordinates of output pixel at line u, and column v, where u = 0 to N-1, and v = 0 to M-1.
- three basic color frames (components) form the image of each pixel.
  (a) calculate horizontal position (in input grid) of the first generated output pixel, x(0), located between the first and second input pixel, at (LineCounter) at position line i:
  Ceiling mode of optical distortion: x(0) = [L - 1 - (LineCounter)] / L .
  Floor mode of optical distortion: x(0) = (LineCounter) / L.
  (b) calculate horizontal position (in input grid) of the n-th generated output pixel, x(n): x(n) = x(n-1) + Delta, where n is the index of the input pixels, and Delta = [ M - 1 - 2 * x(0) ] / [ M - 1 - 2 * (GroupCounter) ].

(4) Interpolate the output value of all color components of each pixel of the input image.
- Keystone output value calculation, for all color components of all pixels:
  (a) Int. [x(m)] = F [x(m)], where m is the index of the generated output pixels, and position difference between input pixels, Diff. [x(m)] = x(m) - F [x(m)].
  (b) value of generated output pixel, Val. [x(m)] =
  Diff. [x(m)] * I[i, F [x(m) +1] + [1 - Diff. [x(m)]] * I[i, F [x(m)].

(5) Correct (non-uniform) edge effects at both ends of each line.
  (a), (b) for m-th pixel pointing on first or last index of the generated output pixel, value of output 'edge' pixel =
  { [Diff. [x(m)] ] * I[i, F [x(m)+1]] + [1 - Diff. [x(m)] ] * I[i,F [x(m)]] } * x(0).

(6) Transmit the output image to the display device.
  (a) individually - pixel by pixel, or (b) collectively - set of all output pixels.

(7) Display the perfected optical image.

ELECTRONIC KEYSTONE CORRECTION FOR ELECTRONIC DEVICES WITH A VISUAL DISPLAY

FIELD AND BACKGROUND OF THE INVENTION

The present invention relates to image processing for electronic devices having a visual display. In particular, this invention relates to a method of electronic Keystone correction for video and data projectors which exhibit optical distortion on the display screen, and for CAD/CAM applications.

A major problem of electronic devices having visual displays (e.g., video and data projectors, computers) operating with three liquid crystal display (LCD) panels is that when the projector is not properly aligned with the screen (i.e., the ray of the projected image is not perpendicular to the projection screen), the projected image on the screen undergoes optical trapezoidal distortion. Electronic or computer software correction of the optical trapezoidal distortion results in fractures of the projected image, due to limited resolution of the finite sized digital grid. In the present invention, a new way is shown to correct the optical trapezoidal distortion electronically or by the use of computer software, in way that eliminates fractures (i.e., Keystone correction using the following method eliminates optical trapezoidal distortion along with fractures of an image resulting from conventional optical correction).

Another distortion to the display of an image by an electronic device occurs during the drawing of a line diagonal to the x- and y-axes (i.e., parallel to neither axis). An example of this is computerized drawing or graphics, widely used, for example, in the field of computerized automated design/computerized automated manufacturing (CAD/CAM). Drawn lines appear fractured on the visual display, due to limited resolution of the finite sized digital grid. The above types of distortion of a displayed image are collectively referred to as the Keystone problem, and a solution to the Keystone problem is known as a Keystone correction or Keystone solution.

For processing and projection of full range color images, the three basic colors, red, green, and blue are typically used; other color sets which may be used include YUV, and YCrCb, as examples. Until recently, electronic devices with projection systems and visual displays, either had three separate LCD panels with three separate lenses, or a single LCD panel incorporating the three basic, or other set of, colors. In either of these image processing and projection systems, optical trapezoidal distortion, or the Keystone problem, is simple to solve by adjusting the mirror system, containing reflected data coming from each LCD.

New projectors have been developed which incorporate a single lamp, three LCDs, and a single lens, where the image data is split and collected by beam splitters and collectors. In such electronic devices, it is essentially impossible to solve the Keystone problem by changing angles of reflective mirrors, since the light originates and terminates within a single lamp and a single lens. Therefore, a sophisticated electronic solution to the Keystone problem is needed.

There is thus a need for, and it would be useful to have, a method of Keystone correction for electronic devices having a visual display, and for CAD/CAM software or any graphics application, which leads to the reduction or substantial elimination of optical distortion, and concurrent elimination of fracture lines appearing on the display screen. Moreover, it would be highly efficient and advantageous to have a method of electronic Keystone correction for electronic devices, which could operate as part of the mechanisms of standard electronic devices, for example, video and data projectors, televisions, computers. Furthermore, there is a need for such an electronic Keystone correction method which can operate in real time domain.

SUMMARY OF THE INVENTION

The present invention relates to a method of electronic Keystone correction for electronic devices having visual displays which exhibit optical distortion on the display screen. Examples of electronic devices which, are suitable for application of the Keystone correction include video and data projectors, cameras, computer displays for graphics applications, video games and televisions.

The method of electronic Keystone correction of the present invention is based on a unique combination of computation and electronic (i.e., physical) manipulation of images featuring individual pixels positioned in a grid located in a visual display screen. Hereinafter, in the present invention, the word 'image' refers to a digitally coded two-dimensional array of picture elements, known as pixels. Hereinafter, the word 'pixel' refers to a dynamic range that results in luminous radiance. The pixel is located within a digital grid characterized by a two-dimensional coordinate system. A pixel features two components, a position, and a value or magnitude. The position of a pixel is described by a two-dimensional function in grid space. The value, or magnitude, of a pixel represents the magnitude of illumination at a particular position in grid space of that component of the image identified by the pixel. Magnitude of illumination relates to a given set of three basic color components of each pixel (e.g., red, green, and blue; YUV; or YCrCb).

The method of electronic Keystone correction of the present invention features seven principle steps: 1) characterization of the size of the input image, 2) determination of the number of generated pixels in the output image, 3) determination of the real position of each pixel in the output image by performing an electronic distortion to the input image opposite to the optical distortion of the input image, 4) interpolation of the output value of all color components of each pixel of the input image, 5) correction of (non-uniform) edge effects at both ends of each line of pixels in a way that results in straight diagonal lines along each of the two sides of the output image, 6) transmission of the output image to a display device, pixel by pixel individually, or as a set of all output pixels collectively using a memory buffer, and 7) display of the perfected optical image.

The method of electronic Keystone correction for electronic devices having a visual display, of the present invention, leads to elimination of the appearance of optical distortion, and concurrent line fractures on the visual display screens, and is applicable to CAD/CAM and graphic software applications. The Keystone correction of the present invention is applicable to real time domain of operation of electronic devices with visual displays.

According to the present invention, there is provided a method for correcting an optical distortion of an image on a visual display screen, the steps of the method being performed by a data processor, the method comprising the steps of: (a) receiving an input image featuring pixels, (b) determining a distortion mode of the input image, (c) determining a number of the pixels in the input image, (d) determining a number of horizontal lines of the pixels in each group of the horizontal lines of the pixels in the input image, (e) determining a number of the groups of the horizontal lines of the pixels in the input image, (f) determining a number of output pixels of each horizontal line in a corrected output image, (g) determining a plurality of positions of the pixels of the input image, (h) performing an opposite electronic distortion to the optical distortion of the input image, (i) determining the plurality of positions of the output pixels of the opposite electronic distortion to the optical distortion of the input image, (j) determining a plurality of values of the output pixels of the opposite electronic distortion to the optical distortion of the input image to form the corrected output image, (k) correcting a plurality of edge effects in the horizontal lines of the plurality of the output pixels of the corrected output image to form a straight diagonal line along each of two sides of the corrected output image, (l) transmission of the plurality of the output pixels of the corrected output image to a visual display device, and (m) display of the corrected output image on the visual display screen.

According to the present invention, there is provided a method for correcting an optical distortion of an output image on a visual display screen, the steps of the method being performed by a data processor, the method comprising the steps of: (a) receiving an input image featuring pixels, (b) determining a distortion mode of the input image, whereby the distortion mode is selected from the group consisting of floor mode and ceiling mode, the floor mode featuring the input image narrower at top, the ceiling mode featuring the input image narrower at bottom, (c) performing an opposite electronic distortion to the optical distortion of the input image, (d) determining a plurality of positions of output pixels of a corrected output image from the opposite electronic distortion to the optical distortion of the input image, (e) determining a plurality of values of the output pixels of the corrected output image by interpolating values of the pixels of the input image, (f) correcting a plurality of edge effects in horizontal lines of the output pixels of the corrected output image to form a straight diagonal line along each of two sides of the corrected output image, (g) transmitting the output pixels of the corrected output image to the visual display device by a means selected from the group consisting of individually, whereby each output pixel of the corrected output image is transmitted separately to the visual display device, and collectively, whereby the plurality of the output pixels of the corrected output image are transmitted as a single set to the visual display device, and (h) display of the corrected output image on the visual display screen.

According to the present invention, there is provided method of performing an opposite electronic distortion to an optical distortion of an image comprising the steps of: (a) receiving the image featuring pixels, (b) calculation of a horizontal position of each of a plurality of first generated output pixels of an output image in grid space of the image, the horizontal position of each of the plurality of the horizontal positions located between first input pixel of each horizontal line and second input pixel of each horizontal line in the grid space of the image, the calculation performed according to the distortion mode of the image, using a LineCounter, and (c) calculation of the plurality of the horizontal positions of remaining output pixels of the output image, the calculation performed according to the distortion mode of the image, using a GroupCounter.

The present invention could be implemented by hardware or by software on any operating system of any firmware or a combination thereof. For example, as hardware, the invention could be implemented as a chip or a circuit. As software, the invention could be implemented as a plurality of software instructions being executed by a computer using any suitable operating system.

BRIEF DESCRIPTION OF THE DRAWINGS

The invention is herein described, by way of example only, with reference to the accompanying drawings, wherein:

FIG. 4 is an illustration of a conventional electronic distortion (opposite to the optical distortion) of the example shown in FIG. 3, resulting in line fractures.

FIG. 6 is a flow diagram of a detailed preferred embodiment of implementing the electronic Keystone correction method according to the present invention.

DESCRIPTION OF THE PREFERRED EMBODIMENTS

The present invention is of a method of electronic keystone correction for electronic devices having visual displays which exhibit optical distortion on the display screen.

The components and operation of a method of electronic Keystone correction according to the present invention are better understood with reference to the drawings and the accompanying description. It is to be noted that illustrations of the present invention shown here are for illustrative purposes only and are not meant to be limiting.

Figure 1:
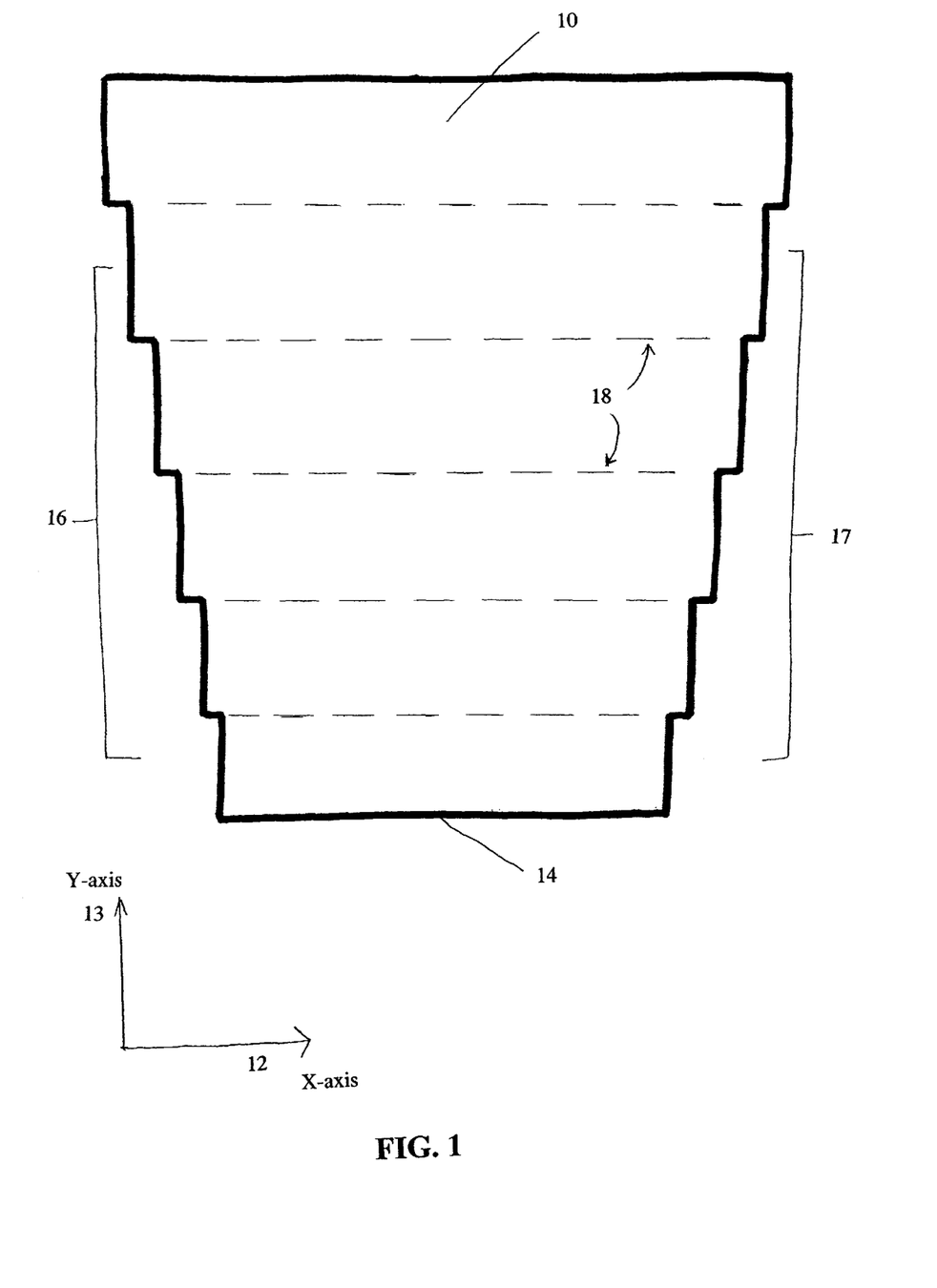
FIG. 1 is an illustration of a digital square deformed by trapezoidal distortion.

Referring now to the drawings, FIG. 1 is an illustration of a digital square 10, deformed by trapezoidal distortion. FIG. 1 represents a simulation of a conventional electronic or software trapezoidal distortion to a (non-distorted) digital image of a perfect square, positioned in digital grid space in the memory of an electronic display device. An x-axis 12 and a y-axis 13 are shown, for geometrical perspective. Conventional trapezoidal distortion to the square 10 causes shrinkage along the x-axis 12, from the top to the bottom width 14 of the square 10, and results in fractures along the left side 16, and fractures along the right side 17, of the square 10. Side fractures 16 and 17 are shown connected by drawn-in trapezoidal baselines (dotted lines) 18 of the distorted square 10. Fractures along the left side and right side, 16 and 17, respectively, of distorted square 10, take on the appearance of a staircase-like form. The analogy to a distorted video or data projected image, is that complete correction to the trapezoidally distorted square 10, involves two principle corrections, 1) restoration of the square shape, and 2) elimination of side (and line) fractures 16 and 17. The electronic Keystone correction of the present invention simultaneously performs these two principle corrections to a distorted image appearing on a video or data projector display screen.

Figure 2:
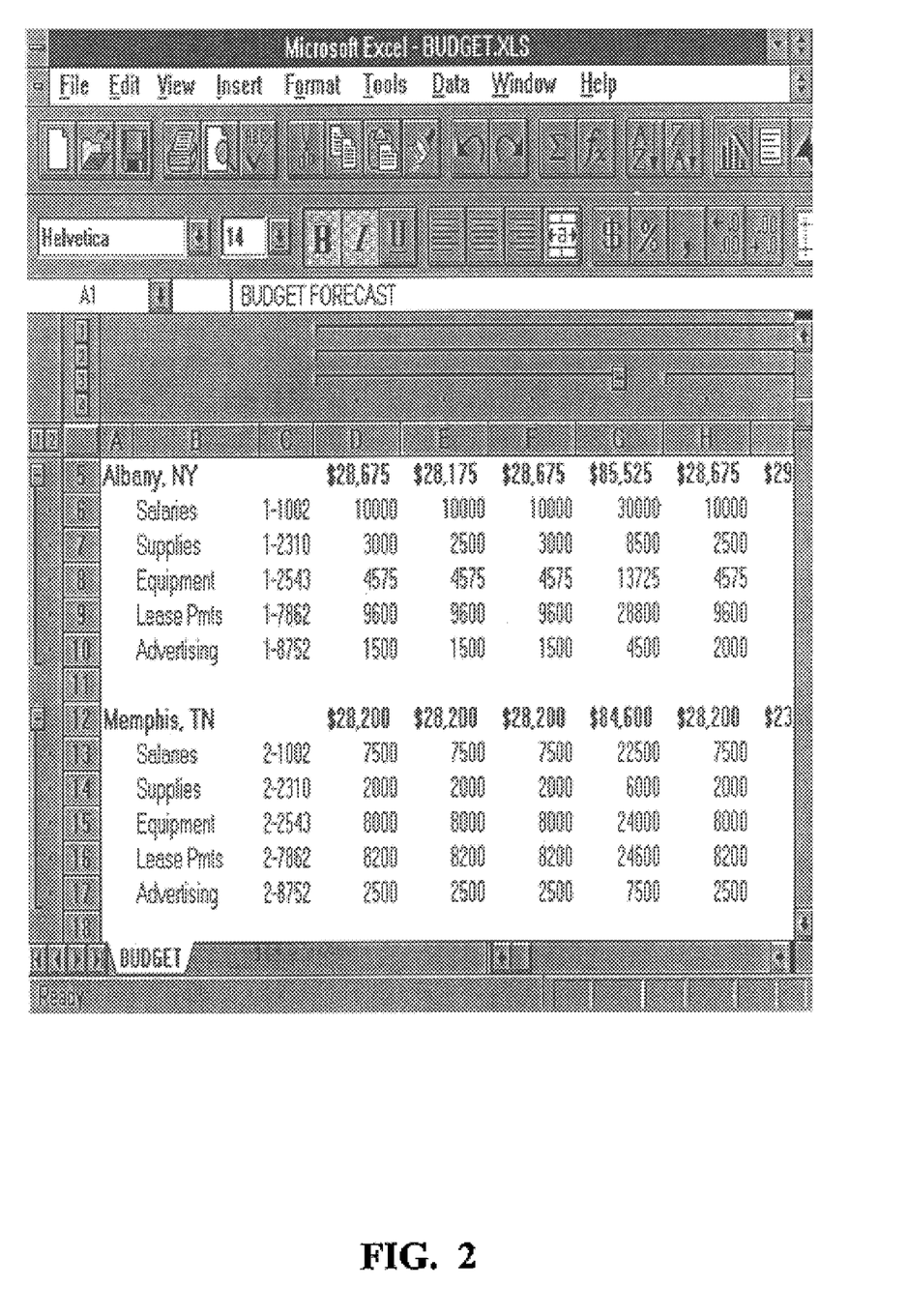
FIG. 2 is an illustration of an example of an original (non-distorted) image projected on a display screen of an electronic device.

FIG. 2 is an illustration of an example of an original (non-distorted) image 20 projected on a display screen of an electronic device, featuring numerical data 22, and textual data 24. The projected image 20, could be for example, a cathode ray tube (CRT) display screen of a computer, featuring a set of pixels forming an image positioned within a digital grid (grid space). Without trapezoidal distortion, left side 26 and right side 28 of image 20 are straight, and nonfractured. Moreover, the width of the top line of pixels 30, and the width of the bottom line of pixels 32, of the image 20 are of equal size. The numerical data 22 and textual data 24 are clearly displayed with little or no distortion of any kind.

Figure 3:
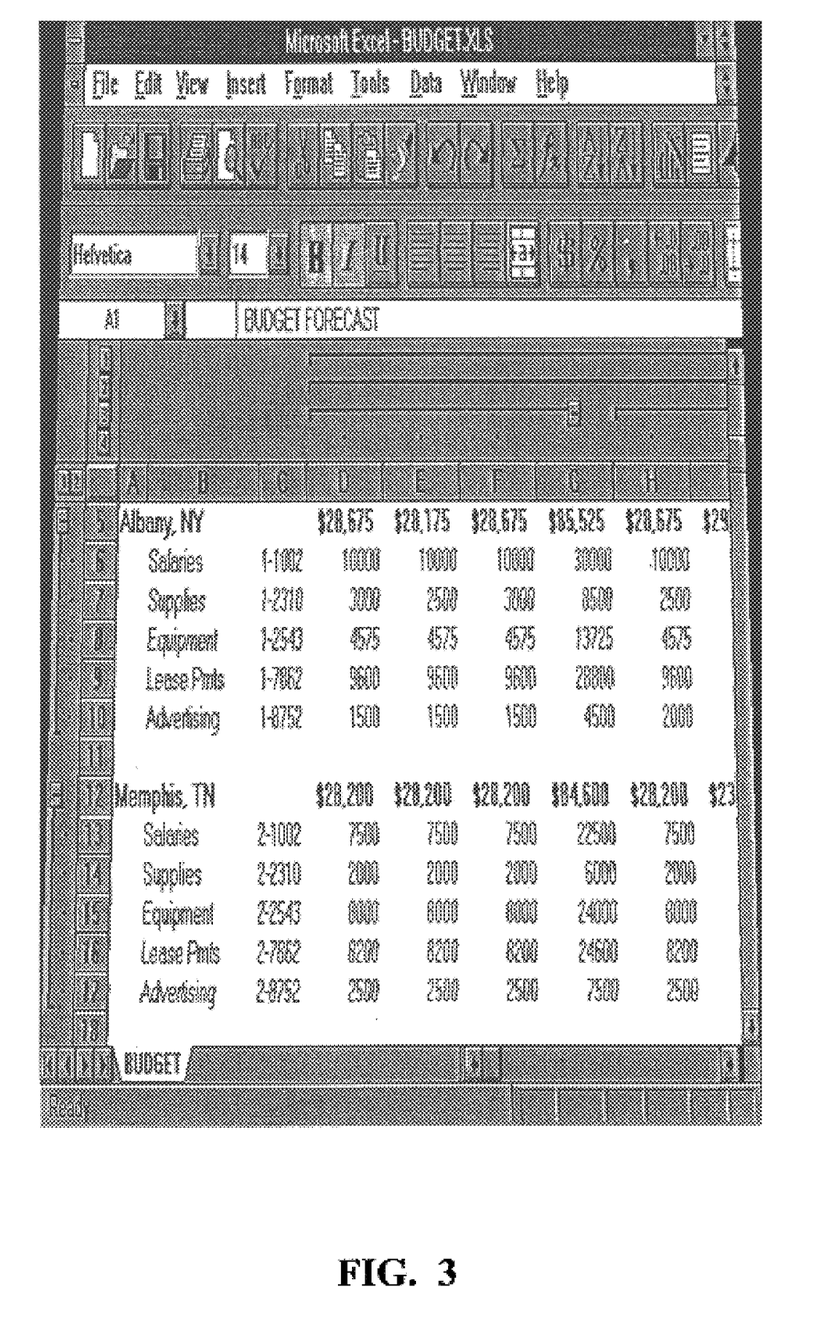
FIG. 3 is an illustration of an example of trapezoidal distortion (resulting from optical adjustment only) of the image shown in FIG. 2.

FIG. 3 is an illustration 34, of an example of optical trapezoidal distortion of image 20 shown in FIG. 2. This optical distortion of image 20, resulting in image 34, is of analog form, and results in a perfect trapezoidal distortion, with the width of the top line of pixels 44 being less than the width of the bottom line of pixels 46 (i.e., trapezoidal geometry), and without appearance of line or side fractures in the image 34. Numerical data 36 and textual data 38 of image 34 appear with essentially no distortion, as they did in FIG. 2 (reference numbers 22 and 24, respectively). Moreover, the left side 40, and the right side 42, of image 34, are perfectly diagonal from top to bottom of image 34, without fractures.

FIG. 4 is an illustration 48, of a conventional electronic distortion (opposite to the optical distortion) of the example shown in FIG. 3, resulting in the appearance of line fractures throughout the entire image 48. Conventional electronic distortion, in a way opposite to the optical distortion, as an attempt to make adjustment (correction) to the optical trapezoidal distortion, causes groups of pixels to shift their orientation in a direction perpendicular to the y-axis, resulting in a horizontal shift of groups of vertically oriented lines. This shift results in fracturing of the left side 54, and the right side 56, of image 48.

As a comparison to FIG. 4, previously shown numerical data (FIG. 3, reference number 36; and FIG. 2, reference number 22) and textual data (FIG. 3, reference number 38; and FIG. 2, reference number 24) now appear distorted, shown here in image 48 as reference numbers 50 (numerical) and 52 (textual), respectively. As in the case of the illustration of the trapezoidally distorted square (FIG. 1, reference number 10), left side 54 and right side 56 of image 48 now take on a staircase-like appearance, noticeable by focusing in on a few fractures (steps) 58 of the left side 54 of the staircase-like form. Image 48 exhibits trapezoidal geometry, whereby the width of the top line of pixels 60 is larger than the width of the bottom line of pixels 62, but in an opposite sense of image 34, as indicated by the top and bottom pixel lines in image 34 (FIG. 3, reference numbers 44 (top line) and 46 (bottom line), respectively). This opposite effect is due to the electronic or software distortion, shown in image 48 being opposite to the initial optical distortion shown in image 34.

Another example (not shown) of the same type of fracturing shown in image 48 of FIG. 4, is that following the projection of an image of a diagonal line drawn by using CAD/CAM, or a similar computer graphics application on the screen of an electronic display device. The diagonal line is fractured as a result of using conventional electronic or software techniques to correct an initial optical distortion of the projected image of the diagonal line.

The concept of the method of the electronic Keystone correction of the present invention as applied to optically distorted images, such as that shown in FIG. 3, is described as follows. Initially, assume that the original, non-distorted image 20 of FIG. 2 is virtually increased to an infinite size, via virtually increasing the display grid to infinity (not shown). If the display grid of an LCD panel is of infinite size, there would exist an infinite number of lines (rows) of pixels, such that between any two points (pixels) on the grid, there would exist an infinite number of points (pixels) between them. Following scale up to an infinite size, the original infinite sized image is distorted according to a trapezoidal geometry, yielding a trapezoidally distorted image in infinite space (not shown). An electronic display screen having an infinite number of pixels translates to a display screen providing perfect visual resolution and without fracture of trapezoidally distorted images.

Following trapezoidal distortion of the image 20 (FIG. 2) in infinite space, the image 20 is returned back to its original size, along with its form of trapezoidal distortion (not shown). However, following return to its original size, the trapezoidally distorted image exhibits no fracturing effects (for example, of the type shown in image 48 (FIG. 4, reference numbers 50, 52, 54, 56, and 58)), since it was previously a distorted image in infinite grid space having perfect resolution. This infinite scale up procedure results in avoiding the fracturing effect of a distorted image caused by trapezoidal distortion.

Figure 5:
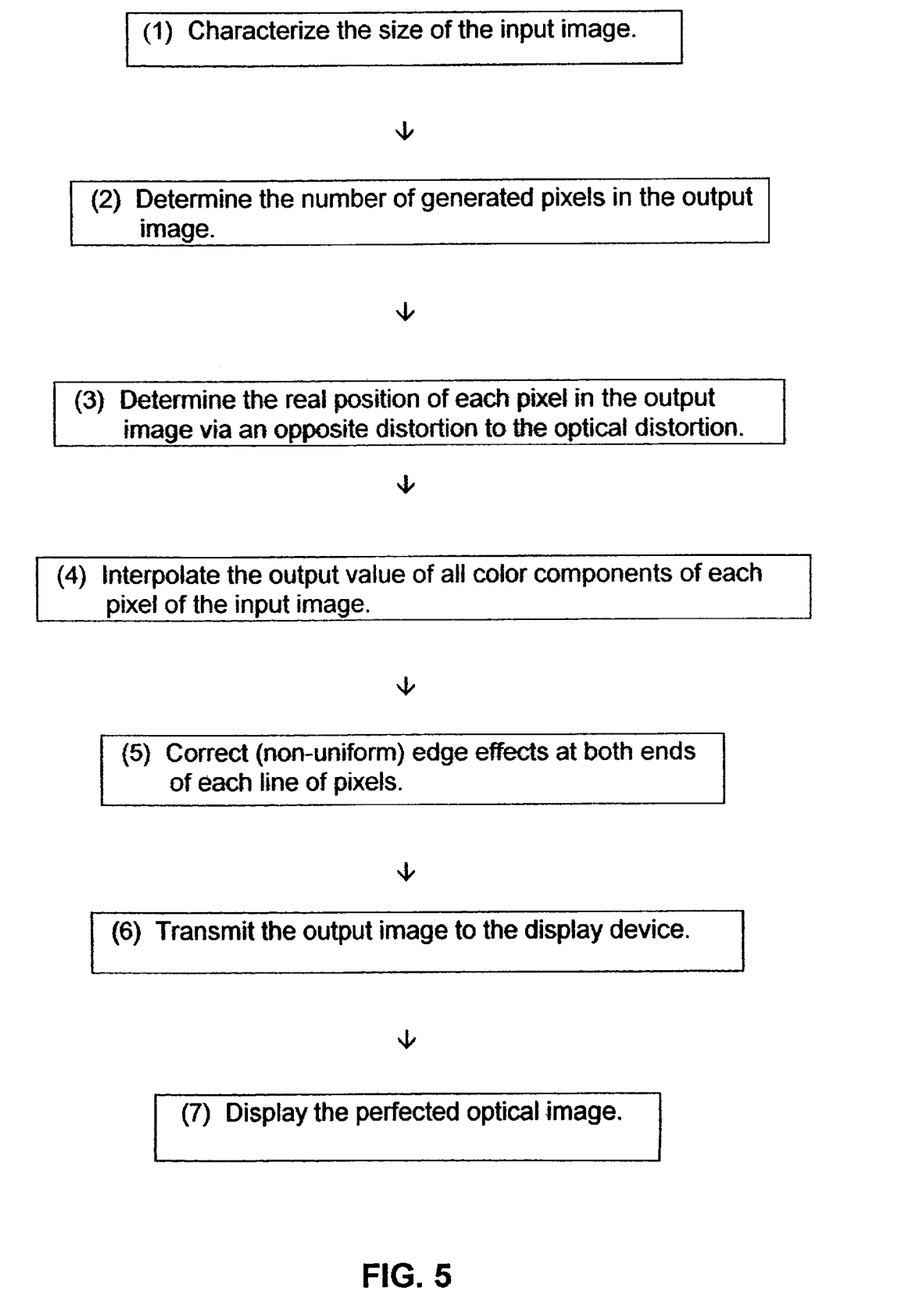
FIG. 5 is a flow diagram of a preferred embodiment of the method of the electronic Keystone correction according to the present invention.

The preceding conceptualization of the method of the electronic Keystone correction serves as the basis of a preferred embodiment of the method of the electronic Keystone correction of the present invention, shown by the flow diagram in FIG. 5. In FIG. 5, each principle step of the method of the Keystone correction is numbered and enclosed inside a frame. FIG. 6, also a flow diagram, shows a detailed preferred embodiment for implementing the method of FIG. 5. The Appendix features further details and pseudo-code of the preferred embodiments described in FIGS. 5 and 6.

As shown in FIG. 5, the preferred embodiment of a method of the electronic Keystone correction of the present invention is as follows.

In Step 1, for a given distorted image displayed by an electronic device with a visual display screen, the size of the distorted image is first characterized. Moreover, the type of Keystone distortion of the distorted image is determined according to the geometry of the distorted image. If the distorted image features a narrower top, the distortion is termed a Keystone Ceiling mode. Alternatively, if the distorted image features a narrower bottom, the distortion is termed a Keystone Floor mode. Application of the particular steps of the Keystone correction method of the present invention to a distorted image depends upon the mode of distortion. Additionally, in Step 1, groups of lines forming the input image are defined.

In Step 2, the number of pixels of the output corrected image are determined in terms of a pixel density, or number of generated output pixels per line of grid space of the input image.

In Step 3, the magnitude and position of each generated output pixel in the input image grid space are defined and determined. This step in the method of the present invention features determination of the real position of each pixel in the output image by way of performing an electronic distortion to the input image opposite to the optical distortion of the input image.

In Step 4, the input pixels are corrected through interpolation of each input pixel, including interpolation of each color component of each pixel. Sets of pixel output values result from multiple iterations of Keystone interpolations of all the pixels and of all the pixel color components of the input image.

In Step 5, edge effects relating to the first and last pixel of each line of pixels are corrected, based on the iterative results of the sets of non-edge corrected pixels. Here, edge effects refer to visual non-uniformities of 'outer' edges (i.e., first and last output pixels) of the output corrected image, and not to possible non-uniformities of 'internal' edges inside the output corrected image.

In Step 6, the output corrected image is transmitted to the electronic display device, individually, pixel by pixel, or collectively, as a set of all output corrected pixels.

In Step 7, the preferred embodiment of the method of electronic Keystone correction of the present invention culminates with the display of the perfected (corrected) optical image, featuring the set of all corrected pixels of the image projected on the grid of the screen of the electronic display device.

FIG. 6 shows a flow diagram of a detailed preferred embodiment of implementing the electronic Keystone correction method according to the present invention, as shown in FIG. 5. Principle step numbers and titles shown in FIG. 6 are identical to those shown in FIG. 5. For each principle method step, definitions of important terms, and one or more substeps representing further of the electronic Keystone correction method are included. In the following description of the preferred embodiment of the present invention, definitions are indicated by a hyphen, substeps are indicated by a letter in parentheses, and the multiplication operation is indicated by the asterisk, *.

In FIG. 6, characterization of the size of the input image, Step 1, includes defining the size of the input image, bounded in an area of N rows (lines) by M columns, within grid space (input grid domain). The distortion mode of the input image is then defined. In a Floor mode, the optical displayed image is narrower at the bottom, and in a Ceiling mode, the optical displayed image is narrower at the top.

In step (a), of Step 1, the number of lines per group (i.e., the number of horizontal lines, spanning left to right within input grid space, per each step of the staircase-like form of the input image, which can also be considered as the number of lines per each group of shifted rows of initially vertically oriented lines positioned in grid space), L, is evaluated by using the Floor function, F, such that L=F[1/tan (k)]. L is counted by iteration in step (a) by using a line counter, (LineCounter), initialized to 0 and counts up to L−1. The Floor function, F, is defined as the closest lower integer part of a real number, and (k) is defined as the angle of trapezoidal distortion, or the Keystone angle.

Additionally, in Step 1, the number of groups of lines (i.e., the number of steps of the staircase-like form) featured within the input image is evaluated by using the Ceiling function, C, and is counted in step (b) by determining a number of groups of lines of pixels equal to the Ceiling function of (the number of input lines divided by the number of lines per group), i.e., number of groups=C (N/L). The Ceiling function is defined as the closest upper integer part of a real number. A group counter, (GroupCounter) is defined as a counter of the number of groups in the image. The (GroupCounter) counts up or down, depending upon the Keystone mode of distortion, Ceiling or Floor. For the Keystone Ceiling mode, a given pixel in the distorted image appears narrower at the top, and is to be corrected or compensated by narrowing or shrinking the pixels at the bottom of the image. In the Ceiling mode, the (GroupCounter) is initialized to 1, and counts in an upward direction, following the correction of each line group. Alternatively, for the Keystone Floor mode, a given pixel in the distorted image is narrower at the bottom, and is to be corrected or compensated by narrowing or shrinking the lines at the top of the image. In the Floor mode, the (GroupCounter) is initialized to C (N/L), and counts in a downward direction, following the correction of each line group.

In Step 2, the number of pixels in each line of the input image is defined as M, i.e., (input pixel number)=M. In step (a), the number of pixels generated per line of the output corrected image is based on M, and is equal to M−[2* (GroupCounter)], or number of generated output pixels=M−[2* (GroupCounter)], where the (GroupCounter) is the same as before, i.e., a counter of the number of lines per group. During determination of the number of output pixels generated per line of corrected image, the (GroupCounter), in addition to serving as a counter of the number of lines per group, also represents the number of black pixels externally inserted in each line of corrected image before the first generated output pixel is sent to the electronic display screen, and after the last generated output pixel is sent to the electronic display screen. The total number of pixels in an output line is M, and is equal to the number of generated output pixels plus the number of black pixels inserted before and after generation of lines of output pixels.

In Step 3, an opposite electronic distortion to the optical distortion of the input image is performed on the input image. The magnitude (illumination) of each pixel of the input image, incorporating a set of three basic color components required to form the image, is defined as I(i,j), where i and j are the position coordinates, in input grid space, of the input pixel in line i and column j, and where i=0 to N−1, and j=0 to M−1. The magnitude (illumination) of each pixel of the output corrected image is defined as O(u,v), where u and v are the position coordinates of the output pixel in line u and column v, and where u=0 to N−1, and v=0 to M−1.

In step (a), of Step 3, as a starting point of generation of output pixels, the horizontal position of the first generated output pixel, x(0), in terms of input grid space, is located between the first and second input pixels. The value of x(0) is calculated once for every new line of the output grid. The first generated pixel of the output corrected image intentionally does not correspond to the first pixel of the input image, due to edge effects present in the input and output images. These edge effects are accounted for with respect to corrected pixels in the output image, in the preferred embodiment of the method of the Keystone correction of the present invention. First and last generated pixels of each line (row) of the output corrected image correspond to edge pixels. Edge pixels are separately evaluated, according to Step (5).

In step (a), the value of the first generated output pixel, x(0) is calculated according to the mode of the Keystone distortion. If the distortion is of the Keystone Ceiling mode (i.e., narrower at the top, requiring shrinking at the bottom, of the input pixel), then x(0) is equal to the number of lines in each group of pixels, L, minus one, minus the index pointing at the current line within the group of lines, (LineCounter), divided by the number of lines in each group of pixels, L, i.e., x(0)=[L−1 (LineCounter)]/L. Alternatively, if the distortion is of a Floor mode (i.e., narrower at the bottom, requiring shrinking at the top of the image), then x(0) is equal to (LineCounter) divided by the number of lines in each group of pixels, L, i.e., x(0)=(LineCounter)/L. For either mode of optical distortion, calculation of x(0) is performed for (LineCounter) at position line i.

In step (b), the horizontal position of the n-th generated output pixel (with respect to input image grid space), x(n), is determined by the iteration formula, $x(n)=x(n-1)+\text{Delta}$, where n is the index of the difference between two output pixels (with respect to input image grid space). Delta= [(input pixel number) $-1-2*x(0)$]/[(output pixel number)$-1$], or in terms expressions for (input pixel number and (output pixel number), Delta=$[M-1-2*x(0)]/[M-1-2*$(GroupCounter)].

In Step 4, interpolation of each input pixel and of each input pixel color component provides generation of Keystone output values of each pixel. The lower integer part of $x(m)$, denoted by Int.$[x(m)]$, is defined by applying the Floor function, such that, Int.$[x(m)]=F[x(m)]$, where m is the index of the generated output pixels. Step (a) is the evaluation of the difference between the real position of each output pixel (in output grid space), $x(m)$, and the real position of each corresponding input pixel (in input grid space), $F[x(m)]$. This difference, Diff.$[x(m)]$, is defined and calculated by the equation, Diff.$[x(m)]=x(m)-F[x(m)]$. In step (b), for each line, i, in output grid space, the value of the output pixel with horizontal position, m, denoted as Val.$[x(m)]$, is evaluated by a linear combination of the value of each output pixel from the values of neighboring input pixels in the input grid, using the previously described difference, Diff.$[x(m)]$. Val.$[x(m)]$ is calculated according to the equation, Val.$[x(m)]=[\text{Diff.}[x(m)]]*I[i,F[x(m)+1]]+[1-\text{Diff.}[x(m)]]* I[i,F[x(m)]]$.

In Step 5 of the preferred embodiment of the present invention, 'edge' effects following correction to the input image are accounted for. Proper correction of edge effects of each line of pixels in grid space is performed in two steps. In step (a), an initial output value of the m-th pixel pointing at the first or last index in the line of generated pixels in the output grid is calculated, i.e., initial output value of an 'edge' pixel=$\{[\text{Diff.}[x(m)]]*I[i,F[x(m)+1]]+[1-\text{Diff.}[x(m)]]*I[i,F[x(m)]]\}$.

In step (b), the initial output value of an 'edge' pixel is multiplied by $x(0)$, resulting in a final corrected output value of an 'edge' pixel, i.e., final corrected output value of an 'edge' pixel=$\{[\text{Diff.}[x(m)]]*I[i,F[x(m)+1]]+[1-\text{Diff.}[x(m)]*I[i,F[x(m)]]\}*x(0)$.

In Step 6, the output corrected image is transmitted to the electronic display device. Each output line features generated output pixels, including (GroupCounter) black pixels positioned before generated pixels, and including (GroupCounter) black pixels positioned after generated pixels, resulting in a total of M pixels in each output line. Output generated pixels can be transmitted in real time, individually, pixel by pixel, without any memory usage, and there is no need to stop the flow of input pixels through the electronic Keystone correction processing method of the present invention, because Delta (position difference between two output pixels, with respect to input grid space) is always greater than 1. Alternatively, generated output pixels can be transmitted, collectively, as a set of all output corrected pixels in a delayed time domain. In this case, the set of values of all corrected output pixels is held in a memory buffer, and then sent to an electronic display screen at an appropriate scan refresh rate, where the scan refresh rate is the rate per second (e.g., 60 Hz), at which a projector screen is refreshed with new information obtained from a memory buffer.

In Step 7, the perfected optical image of the electronic Keystone corrected image is displayed on the display screen of an electronic display device. There is restoration of the original rectangular shape to an initial optical trapezoidally distorted image, whereby trapezoidal geometry of the initial optical trapezoidally distorted image, or of the electronic Keystone corrected image, is absent.

Figure 7:
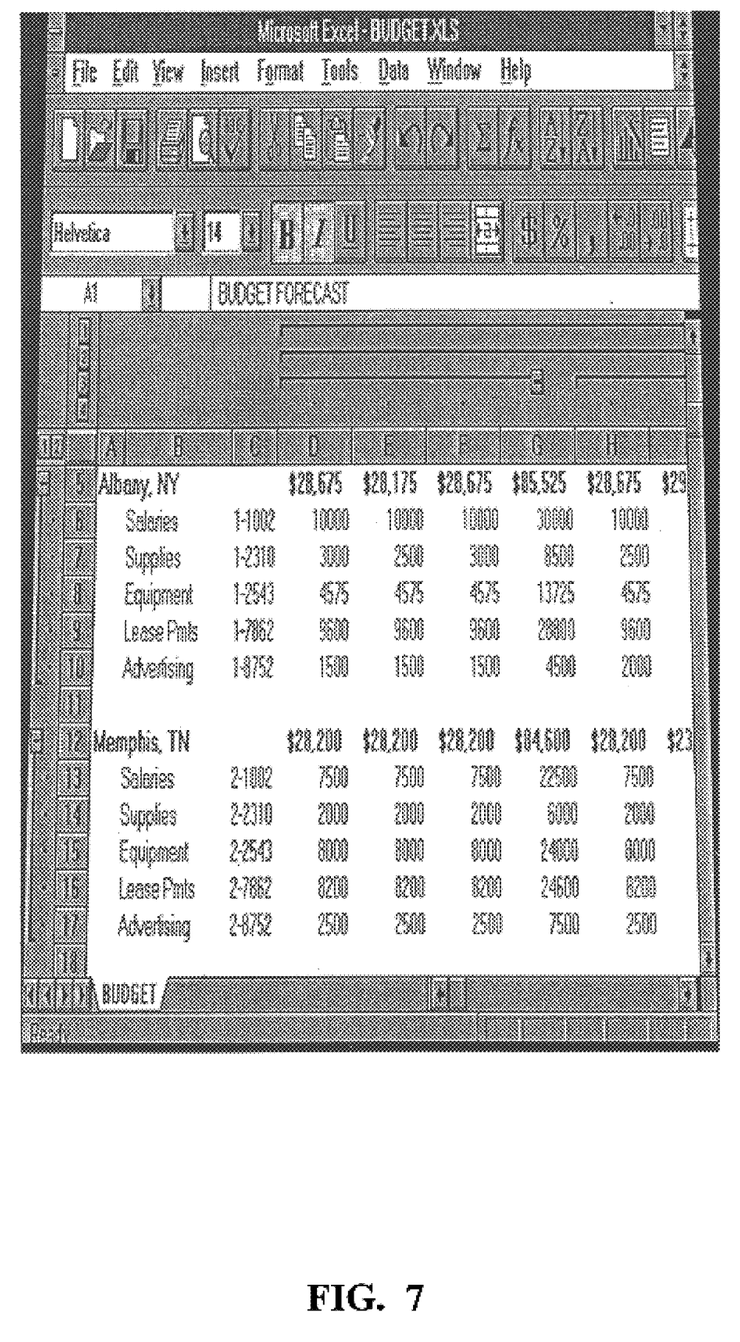
FIG. 7 is an illustration of an example of application of an electronic Keystone correction of the present invention to the distorted image shown in FIG. 3.

FIG. 7 is an illustration 64, of an example of implementation of a preferred embodiment of the electronic Keystone correction of the present invention (as shown and described in FIG. 6) to the trapezoidally distorted image of computer display data shown in FIG. 3. In Keystone corrected image 64, fracturing no longer appears. Keystone corrected image 64, corresponds to the output corrected image transmitted to the electronic display device (FIG. 6, Step 6), prior to projection of the output perfected optical image onto the electronic device display screen (FIG. 6, Step 7) There is continuation of the trapezoidal form of image 64, from the trapezoidal form of image 34 (FIG. 3). The electronic Keystone correction features performing an electronic distortion on an image opposite to an existing optical trapezoidal distortion (FIG. 4). As such, in image 64, the width of the top line of pixels 76 is larger than the width of the bottom line of pixels 78, exhibiting trapezoidal geometry, but opposite to the top and bottom pixel lines in image 34 (FIG. 3, reference numbers 44 (top line) and 46 (bottom line), respectively). Restoration of the original rectangular shape to Keystone corrected image 64, is shown in FIG. 8, as described in Step 7 of FIG. 6.

In Keystone corrected image 64, fractures are absent. Numerical data 66 and textual data 68, exhibit little or no distortion of any kind. Moreover, the left side 70 of image 64, and the right side 72 of image 64 are both straight and non-fractured. Keystone corrected image 64 exhibits no fracturing effects (for example, of the type shown in image 48 (FIG. 4, reference numbers 50, 52, 54, 56, and 58)), which appear as a result of subjecting an optical trapezoidally distorted image to conventional electronic or software adjustment. Examination of a section 74 of the left side 70 of image 64, clearly shows the absence of a fracturing effect, compared to the similarly located section 58 of the left side 54 of image 48 in FIG. 4, which was fractured into a staircase-like form as a result of conventional electronic or software adjustment to image 34 in FIG. 3.

Figure 8:
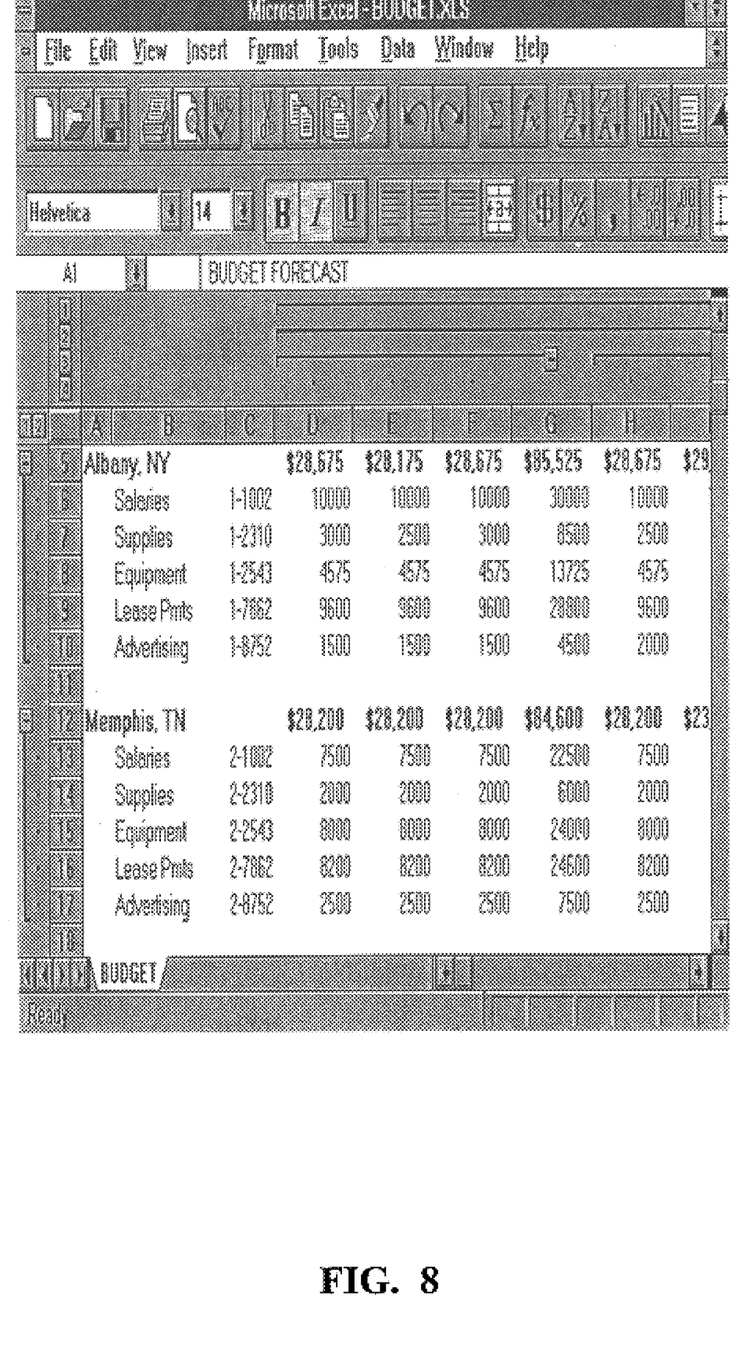
FIG. 8 is an illustration of the display of the final result of the Keystone corrected image of FIG. 7.

FIG. 8 is an illustration 80, of the display of the final result of the Keystone corrected image 64 of FIG. 7. Image 80 represents the projection of the output perfected optical image onto the electronic device display screen (FIG. 6, Step 7), and is the image which appears on the electronic display screen, following transmission of the electronic Keystone corrected output image to the electronic display device (FIG. 6, Step 6). The original rectangular form of the computer display image 20 shown in FIG. 2 is restored, whereby the trapezoidal geometry of the Keystone corrected image 64, is no longer exhibited by output optical image 80, and in image 80, the width of the top line of pixels 90 is equal to the width of the bottom line of pixels 92. Moreover, absence of fractures of any kind is maintained in image 80, similar to image 64 in FIG. 7. This is evidenced by straight, non-fractured numerical data 82, textual data 84, the left image side 86 and the right image side 88, all of image 80 in FIG. 8.

While the invention has been described with respect to one embodiment, it will be appreciated that many variations, modifications and other applications of the invention may be made.

Appendix

Let I be the input image to the keystone system and let O be the output image of that system. We mark the indices of the input/output images as follows:
1. I(i,j) means a pixel value of the input image I. The location is in line i and column j, where i = 0 to N-1 and j = 0 to M-1. N and M are the input image size.
2. O(k,m) means a pixel value of the output image frame. The location is in line k and column m, where k = 0 to N-1 and m = 0 to M-1.
3. Three color frames R, G, B or Y, U, V or Y, Cr, Cb, etc., combine an image.
4. Floor(x) means the lower closet integer to x.
5. Ceiling(x) means the upper closet integer to x.

Step1:
Given α, a degree of the trapezoidal deformation. Define the following parameters:
1. Slope = Tan(α)
2. L = LinesInGroup = Floor(1.0 / Slope)
3. NumberOfGroups = Ceiling(N/L)
4. InputPixels = M Step2:
Define the following initial parameters according to the position of the projector
1. If (Ceiling Mode) Then
       GroupCounter = 1
       GLoopStep = 1
       GroupStop = NumberOfGroups +1
2. Else If (Floor Mode)
       GroupCounter = NumberOfGroups
       GLoopStep = −1
       GroupStop = 0
   End If Step3:
    define n = OutLineCounter = 0 (i.e., n numerates the lines within a frame)
    For every GroupCounter not equal to GroupStop do
        OutputPixels = InputPixels − 2* GroupCounter
        For LineCounter = 0 to LinesInGroup − 1 do
            If (Ceiling Mode) Then
                X0 = (L − 1 − LineCounter)/L
            Else
                X0 = LineCounter/L
            End If
            DX = (InputPixels − 2*X0 − 1)/(OutputPixels − 1)
            For j = 0 to GroupCounter−1 do
                O(n,j) = 0
            For j = (GroupCounter + OutputPixels) to M−1 do
                O(n,j)=0
            Xm = X0   {i.e., position of m-th out pixel in input grid}
            For m = 0 to OutputPixels − 1 do
                IXm = Floor(Xm) (i.e. The integer part of Xm)
                DXm = Xm − IXm (i.e. The fraction part of Xm)
                P1 = I(n,IXm)
                P2 = I(n,IXm + 1)
                Val = P1 * (1−DXm) + P2 * DXm
                If ((m = 0) or (m = OutputPixels − 1))
                    O(n, GroupCounter + m) = Val* X0* Const
                Else
                    O(n, CycleCounter + m) = Val
                End If
                Xm = DX + Xm
            End of For m
        n = n+1
        End of For LineCounter
    GroupCounter = GroupCounter + GLoopStep
    End of For GroupCounter Step4:
Return to step2 to step4 for each color plane R, G, B or Y, U, V or Y, Cr, Cb, etc.
Note: A different way to execute Step1 to Step3 is given as follows:
Step1: Given α, a degree of the trapezoidal deformation. Define the following parameters:
1. Slope = Tan α
2. L = LinesInGroup = Floor(1.0 / Slope)

Step2: For each output frame initiate the following parameters according to the projector position:
    IF CeilingMode THEN     {shrink at bottom in CeilingMode}
        GroupCounter = 1
        GLoopStep = 1
    ELSE                      {shrink at top in FloorMode}
        GroupCounter = NumberOfGroups
        GLoopStep = −1

Step3: Define LineCounter = 0
FOR n =0 TO N-1 DO     {main loop on input lines}
    OutputPixels = M − 2*GroupCounter -continued Appendix

```
If CeilingMode
THEN
    X0 = (L - 1 - LineCounter)/L
ELSE
    X0 = LineCounter / L
End If
DX = (M - 2*X0 - 1) / (OutputPixels - 1)
{insert GroupCounter black pixels at both ends of output line}
For j = 0 to GroupCounter-1 do O(n,j) = 0
For j = (GroupCounter + OutputPixels) to M-1 do O(n, j) =0
FOR m = 0 TO OutputPixels -1 DO    {loop on active OutputPixels}
    IXm = Floor(Xm)                {i.e. The integer part of Xm}
    dXm = Xm - IXm                 {i.e. The fraction part of Xm}
    P1 = I(n,IXm)
    P2 = I(n,IXm+1)
    Val = P1 *(1-dXm) + P2 * dXm
    IF (m = 0) OR (m = OutputPixels -1) Then
                                   {Insert Value to output Frame}
        O(n, m+GroupCounter) = Val* XO*const.
    ELSE
        O(n, m+GroupCounter) = Val
    End If
    Xm = Xm + DX                   {update for next output pixel}
END FOR m
IF LineCounter = L-1 THEN          {update for next line}
    LineCounter = 0
    GroupCounter = GroupCounter + GLoopStep
ELSE
    LineCounter = LineCounter + 1
END IF
ENDFOR n                           {end main loop}
```

What is claimed is:

1. A method for correcting an optical distortion of an image on a visual display screen, the steps of the method being performed by a data processor, the method comprising the steps of:

(a) receiving an input image featuring pixels;

(b) determining a distortion mode of said input image;

(c) determining a number of said pixels in said input image;

(d) determining a number of horizontal lines of said pixels in each group of said horizontal lines of said pixels in said input image;

(e) determining a number of said groups of said horizontal lines of said pixels in said input image;

(f) determining a number of output pixels of each said horizontal line in a corrected output image;

(g) determining a plurality of positions of said pixels of said input image;

(h) performing an opposite electronic distortion to the optical distortion of said input image, comprising the steps of:

(i) calculating a horizontal position of each of a plurality of first generated said output pixels in grid space of said input image, said horizontal position of each of said plurality of said horizontal positions located between first said input pixel of each said horizontal line and second said input pixel of each said horizontal line in said grid space of said input image, said calculating performed according to said distortion mode of said input image, using a LineCounter; and (ii) calculating said plurality of said horizontal positions of remaining said output pixels in said grid space of said input image, said calculating performed according to said distortion mode of said input image, using a GroupCounter;

(i) determining said plurality of positions of said output pixels of said opposite electronic distortion to the optical distortion of said input image;

(j) determining a plurality of values of said output pixels of said opposite electronic distortion to the optical distortion of said input image to form said corrected output image;

(k) correcting a plurality of edge effects in said horizontal lines of said plurality of said output pixels of said corrected output image to form a straight diagonal line along each of two sides of said corrected output image;

(l) transmitting said plurality of said output pixels of said corrected output image to a visual display device; and (m) displaying said corrected output image on the visual display screen.

2. The method of claim 1, wherein the step of determining said plurality of said values of said output pixels of said opposite electronic distortion to the optical distortion of said input image further comprises the step of interpolating said plurality of said values of said input pixels of said opposite electronic distortion to the optical distortion of said input image.

3. The method of claim 2, wherein the step of interpolating said plurality of said values of said input pixels of said opposite electronic distortion to the optical distortion of said input image, further comprises the steps of:

(i) calculating a Keystone output value for each color component of each said pixel in said input image, said calculating comprising the steps of:

(1) evaluating a difference between real said position of each said output pixel and each said real position of each corresponding said input pixel; and (2) evaluating by a linear combination of said value of each said output pixel from said values of said real positions of neighbors of said input pixels in grid space of said input image, using said difference between said real position of each said output pixel and each said real position of each corresponding said input pixel.

4. The method of claim 1, wherein the step of correcting said plurality of said edge effects in said horizontal lines of said plurality of said output pixels of said corrected output image, further comprises the steps of:
   (i) identifying said position and said value of each first generated said output pixel in each said horizontal line of said corrected output image; and
   (ii) identifying said position and said value of each last generated said output pixel in each said horizontal line of said corrected output image.

5. The method of claim 1, wherein said distortion mode of said input image is selected from the group consisting of floor mode and ceiling mode, said floor mode featuring said input image narrower at top, said ceiling mode featuring said input image narrower at bottom.

6. The method of claim 1, wherein the step of correcting said plurality of said edge effects in said horizontal lines of said plurality of said output pixels of said corrected output image includes formation of said a straight diagonal line along each of two sides of said display of said corrected output image on the visual display screen.

7. The method of claim 1, wherein step (h), the step of calculating said horizontal position of each of said plurality of first generated said output pixels in grid space of said input image, includes the steps of:
   (1) for each said first generated position of said output pixels in grid space of said input image, corresponding said input pixel featuring said floor mode of distortion, each said input pixel is shrunk at the top; and
   (2) for each of said first generated position of said output pixels in grid space of said input image, corresponding said input pixel featuring said ceiling mode of distortion, each said input pixel is shrunk at the bottom.

8. The method of claim 1, wherein step (h) the step of calculating said plurality of said horizontal positions of said remaining said output pixels in said grid space of said input image, includes the steps of:
   (1) for each said horizontal position of said remaining said output pixels in said grid space of said input image, corresponding said input pixel featuring said floor mode of distortion, each said input pixel is shrunk at the top; and
   (2) for each said horizontal position of said remaining said output pixels in said grid space of said input image, corresponding said input pixel featuring said ceiling mode of distortion, each said input pixel is shrunk at the bottom.

9. The method of claim 1, wherein the step of determining said number of said output pixels of each said horizontal line of said opposite electronic distortion to the optical distortion of said input image further comprises the step of calculating said number of said output pixels of each said horizontal line of said opposite electronic distortion to the optical distortion of said input image from said number of said input pixels of said input image by using a GroupCounter, said GroupCounter being a counter of said number of said groups of said horizontal lines of said pixels of said input image, whereby said counting of said GroupCounter is selected from the group consisting of up and down, according to said distortion mode of said input image.

10. The method of claim 9, whereby said GroupCounter features a means for insertion of black pixels at both ends of each said horizontal line of said plurality of said horizontal lines of said output pixels of said corrected output image.

11. The method of claim 1, wherein the step of determining said number of said horizontal lines of said pixels in each said group of said horizontal lines of said pixels in said input image, further comprises the steps of:
   (i) evaluating a function of an angle of trapezoidal distortion, said angle of trapezoidal distortion equivalent to a Keystone angle; and
   (ii) using said LineCounter, said LineCounter performing iterative counting of said horizontal lines of said pixels of said input image.

12. The method of claim 1, wherein the step of determining said number of said groups of said horizontal lines of said pixels in said input image, further comprises the steps of:
   (i) determining said distortion mode of said input image;
   (ii) for said distortion mode of said input image being ceiling mode, said ceiling mode featuring said input image narrower at bottom, using said GroupCounter for iterative counting, said GroupCounter being a counter of said number of said groups of said horizontal lines of said pixels of said input image, said GroupCounter is initialized and counts up; and
   (iii) for said distortion mode of said input image being floor mode, said floor mode featuring said input image narrower at top, using said GroupCounter for said iterative counting, said GroupCounter is initialized and counts down.

13. The method of claim 1, wherein the step of transmitting said plurality of said output pixels of said corrected output image to said visual display device includes the step of transmitting said output pixels of said corrected output image to said visual display device by a means selected from the group consisting of individually, whereby each said output pixel of said corrected output image is transmitted separately to said visual display device, and collectively, whereby said plurality of said output pixels of said corrected output image are transmitted as a single set to said visual display device.

14. A method of performing an opposite electronic distortion to an optical distortion of an image, the method comprising the steps of:
   (a) receiving the image featuring pixels;
   (b) determining a distortion mode of the image;
   (c) calculating a horizontal position of each of a plurality of first generated output pixels of an output image in grid space of the image, said horizontal position of each of said plurality of said horizontal positions located between first input pixel of each horizontal line and second said input pixel of each said horizontal line in said grid space of the image, said calculating performed according to said distortion mode of the image, using a LineCounter; and
   (d) calculating said plurality of said horizontal positions of remaining said output pixels of said output image, said calculating performed according to said distortion mode of the image, using a GroupCounter.

15. The method of claim 14, wherein the step of calculating said plurality of said horizontal positions of said remaining said output pixels in said grid space of the image, said calculating performed according to said distortion mode of the image, said distortion mode selected from the group consisting of floor mode and ceiling mode, said floor mode featuring the image narrower at top, said ceiling mode featuring the image narrower at bottom, further comprises the steps of:
   (i) for each said horizontal position of said remaining said output pixels in said grid space of the image, corresponding said pixel of the image featuring said floor mode of distortion, each said pixel of the image is shrunk at the top; and (ii) for each said horizontal position of said remaining said output pixels in said grid space of the image, corresponding said pixel of the image featuring said ceiling mode of distortion, each pixel of the image is shrunk at the bottom.

* * * * *